United States Patent [19]

Nicholson et al.

[11] Patent Number: 4,474,433

[45] Date of Patent: Oct. 2, 1984

[54] CHEMICAL COLOR CONVERSION OF ELECTROCHROMIC DISPLAY MATERIAL

[75] Inventors: Margie M. Nicholson, San Marino; Thomas P. Weismuller, Orange, both of Calif.

[73] Assignee: Rockwell International Corporation, El Segundo, Calif.

[21] Appl. No.: 532,933

[22] Filed: Sep. 16, 1983

Related U.S. Application Data

[63] Continuation-in-part of Ser. No. 330,041, Dec. 11, 1981, abandoned.

[51] Int. Cl.$^3$ .............................................. G02F 1/17
[52] U.S. Cl. ........................... 350/357; 428/411.1; 428/447; 427/108; 427/109; 427/58; 427/126.1; 427/126.2; 427/255.1; 427/255.7; 427/337
[58] Field of Search ................ 350/357; 428/411, 447; 427/108, 109, 58, 126.1, 126.2, 255.1, 255.7, 337

[56] References Cited

U.S. PATENT DOCUMENTS

| | | | |
|---|---|---|---|
| 4,036,551 | 7/1977 | Mori | 350/160 R |
| 4,039,255 | 8/1977 | Yamashita | 350/357 |
| 4,184,751 | 1/1980 | Nicholson | 350/357 |
| 4,210,390 | 7/1980 | Yaguchi | 350/375 |
| 4,266,335 | 5/1981 | Matsumoto et al. | 29/592 |

FOREIGN PATENT DOCUMENTS

| | | |
|---|---|---|
| 2756551 | 6/1978 | Fed. Rep. of Germany . |
| 2005684 | 1/1977 | Japan . |
| 54-137359 | 10/1979 | Japan . |
| WO80/02462 | 11/1980 | PCT Int'l Appl. . |

*Primary Examiner*—Norman Morgenstern
*Assistant Examiner*—Richard Bueker
*Attorney, Agent, or Firm*—Gilbert H. Friedman; H. Fredrick Hamann

[57] ABSTRACT

A deposit of electrochromic display material such as, for example, lutetium diphthalocyanine chemically treated to have substantially the same color as electrolytically cycled deposits of the same display material.

27 Claims, No Drawings

CHEMICAL COLOR CONVERSION OF ELECTROCHROMIC DISPLAY MATERIAL

LICENSE RIGHTS

The invention herein described was made in the course of or under a contract, or subcontract thereunder, with the Department of the Navy.

CROSS-REFERENCE TO RELATED APPLICATION

This application is a continuation-in-part of application Ser. No. 330,041 filed Dec. 11, 1981, now abandoned.

FIELD OF THE INVENTION

This invention relates to electrochromic materials suitable for use in a display device and more particularly pertains to a method of adjusting or changing the color of such material nonelectrically and to the resulting material.

BACKGROUND OF THE INVENTION

Rare-earth diphthalocyanines are known from prior publications to have electrochromic properties in which the color of the diphthalocyanine can change over a period of about eight seconds upon application of a potential difference across an electrochemical cell having a diphthalocyanine film on one of the electrodes. P. N. Moskalev and I. S. Kirin, "Effect of the Electrode Potential on the Absorption Spectrum of a Rare-Earth Diphthalocyanine Layer," *Opt. i Spektrosk*, 29, 414 (1970) and P. N. Moskalev and I. S. Kirin, "The Elecrochromism of Lathanide Dipthalocyanines," *Russian J. Phys. Chem.*, 46, 1019 (1972).

In U.S. Pat. No. 4,184,751 issued to M. M. Nicholson, an inventor herein, and assigned to Rockwell International Corporation, the assignee herein, there is described the use of metal diphthalocyanine complexes as the electrochromically active material in an electrochromic display cell. Rapid color changes in less than 50 milliseconds are achieved, thus alleviating the slow switching time previously reported for rare-earth dipthalocyanine complexes. Power requirements are small because of the low power switching characteristics of the display material and because the display exhibits an open circuit memory of from several minutes to several hours, depending on its construction. A multi-color, i.e., more than two color, display is achieved through use of a range of voltages applied between display and counter electrodes. Color reversal of displayed information and the background against which it is displayed is achieved through use of display electrodes in the background portions of the viewing area as well as in the character segments.

In a simpler type of display device, where color reversal is not required, the background portions of the viewing area are often provided with deposits of the display material surrounding and conforming to the outlines of the segmented character electrodes. This feature is intended to provide a uniform appearance to obscure the character electrodes when the display device is in the erased condition.

Initially, in such a device, the metal diphthalocyanine display material such as, for example, lutetium diphthalocyanine has a bright green color in both the background regions and on the character or display electrodes. Upon electrical cycling, however, the display material on the display electrodes typically does not return to the precise initial color. Instead, it exhibits an olive-green color when cycled to the erased condition. This is objectionable in a display device. When the cycled olive-green display material no longer matches the bright-green background material, confusion in reading the display can occur.

Several approaches have been proposed for use in solving the problem of the failure of the erased display electrodes to match the color of the background. First, the display device could be built to provide electrical switching of the background material, more or less as in the multi-color display mentioned above. However, since the display material in the background area ordinarily needs to be cycled less than that in the character area, and possibly only cycled once, the provision of a separate circuit to accomplish this seems a relatively expensive solution wherein the described simplicity is lost. Second, the background area of the substrate on which the display material is disposed could be tinted so that the color mix of the tint and the uncycled bright green display material would approach the desired olive-green. However, this would require the use of a mask and would thus introduce a costly step in the process. Also, the color obtained in this manner could only approximate the olive-green of the cycled display material on the character electrodes. This could result in a slight visual mismatch. As a third approach, a two-step chemical oxidation and reduction treatment could be used to cycle the bright-green background display material to olive-green, but this alternative also would require relatively complicated, less economical processing.

SUMMARY OF THE INVENTION

The general purpose of this invention is to provide a deposit of electrochromic display material chemically treated to have substantially the same color as electrolytically cycled deposits of the same display material and a relatively inexpensive and uncomplicated chemical method for fabricating the electrochromic display material deposit. This is accomplished by treating the display material with substituted imidazoline and silicone glycol surfactants.

Furthermore, it has been discovered that such treatment of deposited electrochromic display material greatly decreases the time interval required for chemical color switching of the material by certain oxidizing or reducing agents. This increase in the reaction rate of the display material is believed to result from structural changes in the dye film which are brought about by the surfactant. The film structure is thought to become more porous and open and hence more easily penetrated by water, ions and various reactive species. By accelerating the coloring processes of these materials through treatment with surfactant, the materials are likely to be made more useful in, for example, electrochromic displays, electrochromic filters, electrophotography and in chemical sensors for detecting the presence of certain oxidizing or reducing agents such as, for example, chlorine.

DESCRIPTION OF THE PREFERRED EMBODIMENTS

It has been discovered that a deposit of an electrochromic display material such as, for example, lutetium diphthalocyanine, when treated with substituted imidazoline and silicone glycol surfactants, takes on an olive-green color. It does so as a result of the chemical treatment only. The establishment of the olive-green color for the deposit of display material is thus accomplished nonelectrically.

Substituted imidazoline can be represented by the structural formula

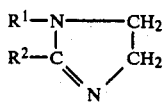

in which $R^1$ and $R^2$ denote substituent groups. In a preferred embodiment, $R^1$ is the group $-CH_2CH_2OH$ and $R^2$ is a fatty acid group or a rosin acid group derived from tall oil as in the product Witcamine AL42-12 sold by Witco Chemical Organics Division, New York, N.Y., and described in their Bulletin 240, April 1979. Tall oil is a mixture of fatty acids and rosin acids obtained from chemical digestion of pine wood. It will be understood that $R^1$ and $R^2$ could be selected from many different groups, including hydrogen, as long as the resulting molecule interacts with the dye surface to produce the desired color modification.

The visual spectrum of the display material color obtained by this chemical treatment has been compared with the olive-green color for the same type of display material obtained by electrolytic cycling. The two colors appear closely matched. It has been observed that the color changes resulting from each approach are due to a similar shift in the same spectral peak. This implies that the two olive-greens thus obtained are intimately related.

Experiments were conducted in which lutetium diphthalocyanine was successfully deposited on substrates treated with the substituted imidazoline and silicone glycol surfactants. The deposit obtained had the characteristic olive-green color. In a comparison experiment, the display material was deposited on an untreated substrate. There was no conversion to olive-green color for the latter deposit.

It is believed that similar results will be obtained when the electrochromic display material is a diphthalocyanine or any other rare-earth element or of yttrium or scandium.

In the experiments conducted thus far, acetone was used as a liquid vehicle. However it is believed that other liquid vehicles will also serve this purpose. A suitable liquid vehicle will mix sufficiently well with the surfactants so that a satisfactory deposit of surfactants is formed as the liquid vehicle is removed. A satisfactory surfactant deposit is one that is uniform and free of spotting. Acetone has an advantage in that it is highly volatile and thus may be readily driven off by air drying. Other less volatile liquid vehicles may be removed by careful heating or evaporation under vacuum.

In addition, in the experiments conducted thus far, the substrates were treated by contacting them with acetone solutions of from one to one-and-one-half grams per liter of both substituted imidazoline and silicone glycol in roughly equal proportions. These surfactants were deposited by immersing the substrates in the acetone solution of surfactants briefly and then allowing the substrates to air dry.

The highest degree of consistently satisfactory success in obtaining a uniform adjustment of the color of an entire film of lutetium diphthalocyanine was achieved when the substrate was microporous polypropylene. This substrate material, pre-treated with the surfactants by the manufacturer, is commercially available as Celgard from Celanese Fibers Marketing Company of Charlotte, N.C. Only partial success has been obtained thus far using substrates of glass or tin-oxide coated glass. The color change achieved using treated substrates of the latter materials was somewhat nonuniform and incomplete as indicated by visual appearance and by optical absorption spectroscopy in the visible wavelength region.

It is apparent that various methods of chemically treating the deposit of electrochromic display material are possible. In one method, a substrate may be treated or contacted directly with a liquid vehicle containing the surfactants prior to the deposition of the display material. The liquid vehicle is then driven or dried off, leaving the surfactants on the substrate. The display material is then deposited on the treated substrate.

Another approach is to deposit the display material on the substrate first and then treat the display material deposit with the surfactants through contact with the liquid vehicle containing them. Care must be taken in this approach to avoid choosing a liquid that will dissolve or mar the deposit of display material.

Yet another approach would use vacuum deposition. This may be done in two ways: the first way is to simultaneously deposit the display material and the surfactants, the second way involves the sequential deposition of these materials in either order. It is believed that vacuum deposition of the surfactants is likely to enable greater control of their amount and of the uniformity of their deposit. However, any method of depositing the display material that gives a uniform film of the desired thickness can be used. Thermal vacuum deposition of the display material was used in the experiments mentioned above.

It is apparent that in any of the above approaches, an entire display device substrate may be treated in each step. The same deposits may be made on both the character electrodes and the background regions of the substrate. No masking is required. This feature of the invention contributes to making it relatively simple and inexpensive to implement.

It is believed that, once the initial color of the display material is switched from bright green to olive-green by the surfactants, the surfactants will not participate further in any color-changing reactions in a display device. This is because the change to olive-green is essentially irreversible under normal display device conditions. Thus, an option is left open to either remove the surfactants after their initial interaction with the display material by a suitable wash procedure or to leave them permanently in the display material deposit.

While the invention has been described with respect to the preferred embodiment thereof, it will be understood by those skilled in the art that various changes in form and details may be made therein without departing from the spirit and scope of the invention.

What is claimed is:

1. A deposit of electrochromic display material on a substrate wherein said display material is in contact with and chemically treated with substituted imidazoline and silicone glycol surfactants to have substantially the same color as electrolytically cycled deposits of the same display material.

2. The deposit of electrochromic display material recited in claim 1, wherein said substituted imidazoline has substituent groups $CH_2CH_2OH$ and a fatty acid group or a rosin acid group derived from tall oil.

3. The deposit of electrochromic display recited in claim 1, wheren said display material is a diphthalocyanine of a rare-earth, yttrium or scandium.

4. The deposit of electrochromic display material recited in claim 3, wherein said display material is lutetium diphthalocyanine.

5. A display device, comprising:
a substrate having a character electrode region and a background region, wherein the character electrode region is adapted for connection to a source of electrical energy and wherein the background region is free of means of connection to a source of electrical energy; and
a deposit of electrochromic display material on the character electrode and background regions of said substrate wherein the portion of said deposit on the background region is chemically treated with surfactant to have substantially the same color as the deposit on the character electrode region after electrolytic cycling of the character electrode region.

6. The display device of claim 5, wherein the surfactant is substituted imidazoline and silicone glycol.

7. The display device of claim 6, wherein said substituted imidazoline has substituent groups $CH_2CH_2OH$ and a fatty acid group or a rosin acid group derived from tall oil.

8. The display device recited in claim 5, wherein said display material is a diphthalocyanine of a rare earth, yttrium or scandium.

9. The display device recited in claim 8, wherein said display material is lutetium diphthalocyanine.

10. A method of providing a chemically treated deposit of electrochromic display material having substantially the same color as electrolytically cycled deposits of the same display material, comprising the steps of:
first providing a substrate;
then treating said substrate by contact with a liquid vehicle containing substituted imidazoline and silicone glycol surfactants on said substrate;
then driving said liquid vehicle from substrate; and
then depositing said electrochromic display material on said treated substrate.

11. The method recited in claim 10, wherein said substituted imidazoline has substituent groups $CH_2CH_2OH$ and a fatty acid group or a rosin acid group derived from tall oil.

12. A method of providing a chemically treated deposit of electrochromic display material having substantially the same color as electrolytically cycled deposits of the same display material, comprising the steps of:
first providing a substrate;
then depositing said electrochromic display material on said substrate;
then contacting said deposited display material with a liquid vehicle containing substituted imidazoline and silicone glycol surfactants; and
then driving said liquid vehicle from said deposited display material.

13. The method recited in claim 12, wherein said substituted imidazoline has substituent groups $CH_2CH_2OH$ and a fatty acid group or a rosin acid group derived from tall oil.

14. A method of providing a chemically treated deposit of electrochromic display material having substantially the same color as electrolytically cycled deposits of the same display material, comprising the steps of:
providing a substrate; and
vacuum depositing said electrochromic display material and substituted imidazoline and silicone glycol surfactants on said substrate.

15. The method recited in claim 14, wherein said substituted imidazoline has substituent groups $CH_2CH_2OH$ and a fatty acid group or a rosin acid group derived from tall oil.

16. The method of claim 14, wherein said display material and said surfactants are vacuum-deposited on said substrate simultaneously.

17. The method of claim 14, wherein said step of vacuum-depositing comprising the steps of:
first vacuum-depositing said display material on said substrate; and
then vacuum-depositing said surfactants on said deposited display material.

18. The method of claim 14, wherein said step of vacuum-depositing comprises the steps of:
first treating said substrate by vacuum-depositing said surfactants thereon; and
then vacuum-depositing said display material on said treated substrate.

19. A deposit of electrochromic display material formed according to the method of claim 10.

20. A deposit of electrochromic display material formed according to the method of claim 11.

21. A deposit of electrochromic display material formed according to the method of claim 12.

22. A deposit of electrochromic display material formed according to the method of claim 13.

23. A deposit of electrochromic display material formed according to the method of claim 14.

24. A deposit of electrochromic display material formed according to the method of claim 15.

25. A deposit of electrochromic display material formed according to the method of claim 16.

26. A deposit of electrochromic display material formed according to the method of claim 17.

27. A deposit of electrochromic display material formed according to the method of claim 18.

* * * * *